Figure 3:
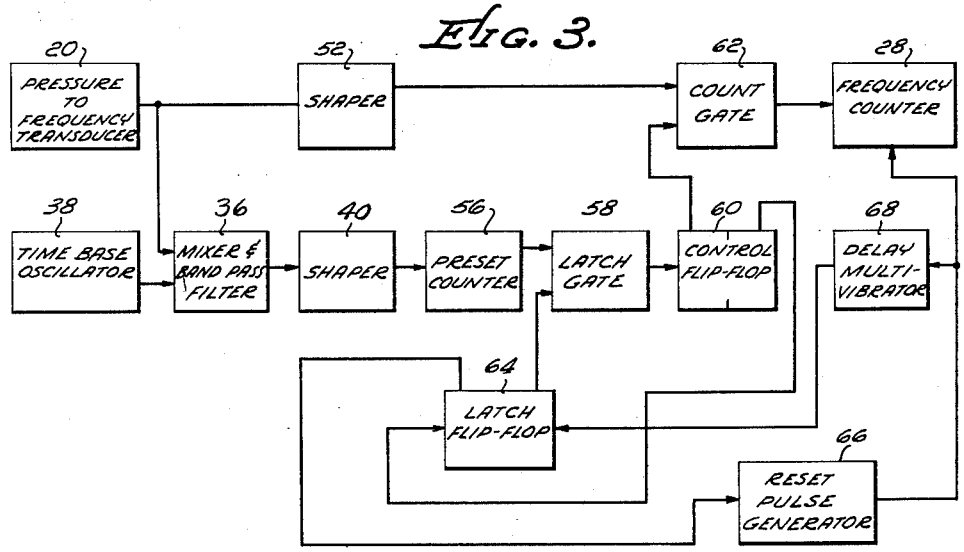

Jan. 1, 1963

J. A. McWAID 3,071,725

LINEARIZING SYSTEM

Filed Nov. 30, 1956

INVENTOR.
JOHN A. McWAID
BY
Allen E. Hambly
ATTORNEY

3,071,725
LINEARIZING SYSTEM

John A. McWaid, Richmond, Calif., assignor to Borg-Warner Corporation, Chicago, Ill., a corporation of Illinois
Filed Nov. 30, 1956, Ser. No. 625,341
1 Claim. (Cl. 324—79)

This invention relates to measuring systems, and more particularly to improved apparatus for compensating for and correctly indicating the quantity being measured by a transducer which may provide a nonlinearly varying output in response to linear variations in the quantity being measured.

In a patent to Frank Reiber, No. 2,455,021, which was issued on November 30, 1948, for a Pressure Meter, there is described and claimed a novel transducer for measuring pressure variations. This transducer includes an oscillator having a stretched wire in the frequency-determining circuit thereof. Variations in pressure to which the transducer is exposed cause variations in tension of the stretched wire. As a result, the frequency of oscillations of the oscillator will vary with pressure. The variations of the frequencies is inverse with the pressure variations. Upon investigation, it was found that the frequency of oscillations do not vary linearly with variations in pressure. Thus, indicating devices which indicate pressure responsive to frequency and which do not take into consideration the nonlinear frequency variation do not provide a correct reading of the quantity being measured.

An object of this invention is the provision of a novel arrangement for providing a linear digital indication responsive to oscillations from a source, the frequency of which varies nonlinearly with the linear variations of a variable.

A further object of the present invention is the provision of a novel linear digital indicator for a measuring transducer of the type which provides as output oscillations having a frequency which varies nonlinearly with linear variations of the quantity being measured.

Yet another object of the present invention is the provision of a novel, useful, and simple arrangement for compensating for the nonlinearities of a transducer used for measuring a linearly varying quantity.

These and other objects of the present invention are achieved in an arrangement whereby oscillations which are derived from a source, the frequency of which varies nonlinearly with linear variations of a related variable, are counted over an interval which is varied to compensate for the non-linear frequency variations to provide a final count which is a correct indication of the variable being measured. This is performed by mixing variable frequency oscillations from the source with the oscillations from a fixed-frequency source. The frequency difference is derived from the mixed frequencies and is used to establish a time base for a counter. This may be accomplished by having a preset counter count the difference frequencies. The preset counter supplies an output pulse whenever it fills. It will be appreciated that the duration, or interval required, for the preset counter to fill will vary with the frequency of the difference frequency being applied thereto. This preset counter output is used to establish the interval over which a second counter is permitted to count oscillations derived from the source of non-linearly varying oscillations.

If the frequency of oscillations from the nonlinear source is too high, the interval established for counting these oscillations by the preset counter is reduced an amount over what it would normally be by the increase in the frequency. If the frequency of the oscillations from the nonlinear source are on the low side, then the interval established by the preset counter is longer than what it should be at this frequency. The amount of correction to be obtained can be controlled by the frequency selected for the fixed-frequency oscillator.

Figure 2:
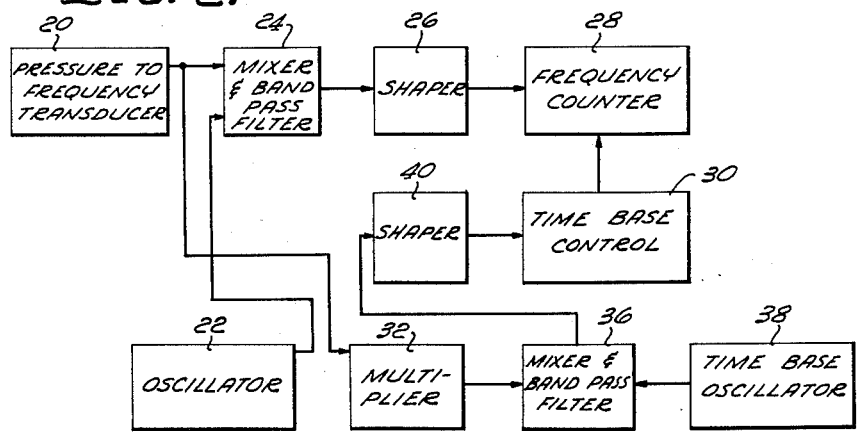
Figure 1:
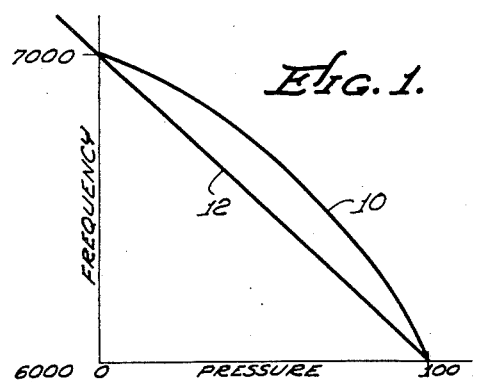

The novel features that are considered characteristic of this invention are set forth with particularity in the appended claim. The invention itself, both as to its organization and method of operation, as well as additional objects and advantages thereof, will best be understood from the following description when read in connection with the accompanying drawings, in which:

FIGURE 1 is a wave shape diagram showing the characteristics of the typical transducer for which a linearizing correction is required; and FIGURE 2 is a block diagram of an embodiment of the invention; and FIGURE 3 is a block diagram of a preferred embodiment of the invention.

Referring now to FIGURE 1, there may be seen the pressure-versus-frequency output characteristic of the transducer previously mentioned by Reiber. This transducer is mentioned by way of illustration of a concrete example of the application of the embodiment of the invention and should not be construed as a limitation thereon. The principles to be described for the embodiment of the invention may be applied with other types of transducers or sources of oscillations which vary nonlinearly with respect to linear variations of a related variable. This transducer provides a frequency output with variations in the quantity being measured which approximates a square-law response. The curve 10 indicates that the frequency varies inversely with the pressure; that is, the frequency is a maximum when the pressure is zero and is a minimum when the pressure is a maximum for the transducer being employed. However, the variations in the frequency of the output of the transducer deviates from the straight-line variation in the pressure being measured an amount which may be seen from FIGURE 1. It would thus appear that the frequency output of the transducer is higher by differing amounts than it should be.

FIGURE 2 shows a block diagram of an embodiment of the invention. A typical transducer of the class intended is designated by the rectangle 20, which is labeled "pressure-to-frequency" transducer. An oscillator 22 which provides oscillations at a fixed frequency has its output, together with that of the transducer applied to a mixer and band pass filter 24. The filter itself provides this double function. The frequency derived as an output from the mixer and band pass filter is the difference between the two frequencies applied to its input. That is, the band pass filter which is employed is tuned to pass only the difference of the input frequencies. If the output of the transducer is identified as $F_p$, and the output of the fixed frequency oscillator is identified as $F_f$, then the output of the mixer and band pass filter will be $F_f - F_p$. This is applied to a pulse shaper 26.

The pulse shaper 26 is a well-known type of circuit, such as an overdriven amplifier, which serves the function of converting a somewhat sinusoidal-shaped input to a substantially rectangular-shaped output. The output of the shaper 26 is applied to a frequency counter 28. The frequency counter 28 is enabled to count the pulses applied to its input only during an interval established by a time base control 30. The time base control establishes intervals for counting which vary to provide compensation for nonlinearities of the changes in oscillations being generated relative to changes in the variable which they represent.

An example of circuitry for providing time base control of a counter will be described in connection with the description of FIGURE 3. The frequency which controls the time base control 30 is obtained by applying the output of the pressure to frequency transducer 20 to a multiplier 32 which serves the function of multiplying the frequency applied thereto to a higher frequency. These circuits are well known, being shown and described on pages 394–397, for example, in the book Radio Engineering by F. E. Termen, published in 1947 by the McGraw-Hill Book Company, Inc.

The multiplier output is applied to a second mixer and band pass filter 36 to which is also applied the output of a time base ocillator 38. This is a second fixed frequency oscillator. The band pass filter 36 is also tuned to pass the difference frequency of its inputs. This difference frequency is applied to a shaper 40, which is similar to the shaper 26. The rectangular output of the shaper 40 is applied to the time base control 30.

For purposes of illustrating the operation of the embodiment of the invention described, and not to be considered as a limitation on the invention, let it be assumed that the pressure to frequency transducer output varies as shown in FIGURE 1, from 7000 cycles at zero pressure to 6000 cycles at maximum pressure. Let the oscillator 22 provide an output frequency of 7000 cycles whereby the output of the mixer and band pass filter 24 varies from 0 to 1000 cycles over the pressure range. Let the multiplier increase the frequency output of the pressure to frequency transducer by a factor of eight and let the time base oscillator provide a fixed frequency output of 148,000 cycles. The output of the mixer and band pass filter 36 will then vary from 92,000 cycles to 100,000 cycles over the range of pressures. The following table shows the results obtained at several points over the pressure range derived from an embodiment of the invention which employed the above parameters.

| Pressure | Transducer Frequency | Frequency at Counter | Time Base Frequency (kc.) | Count |
| --- | --- | --- | --- | --- |
| 0 | 7,000 | 0 | 92.0 | 0 |
| 2.00 | 6,812 | 188 | 93.5 | 2.01 |
| 4.00 | 6,617 | 383 | 95.1 | 3.99 |
| 6.00 | 6,419 | 581 | 96.6 | 6.01 |
| 8.00 | 6,213 | 787 | 98.3 | 8.01 |
| 10.00 | 6,000 | 1,000 | 100.0 | 10.00 |

The interval during which the frequency counter 28 counts the frequency being applied to it is determined by the time base frequency. The count for the various pressures being measured employing the transducer is shown in the table. The departure of the calibration curve from a straight line from zero to full scale pressure is only on the order of 2%.

A preferred arrangement for an embodiment of the invention is shown in FIGURE 3. Similar functioning structures bear the same reference numerals as are employed in FIGURE 2. The pressure to frequency transducer 20 applies its output to a shaper 52, similar to the shapers 26 and 40, and to a mixer and band pass filter 36, which performs the same function as does the mixer and band pass filter 36 in FIGURE 2. It provides an output which is the difference frequency of its inputs from the transducer and the oscillator 38 also connected thereto. This difference frequency is applied to a shaper 40.

The output of the pulse shaper 52 is applied to a count gate 62. The output of the pulse shaper 40 is applied to a preset counter 56. The function of the preset counter is to generate an output at the end of an interval, the duration of which varies inversely to the error in frequency in the output of the transducer. More clearly, this means that the interval which is to be established by the preset counter is shortened when the transducer-output frequency is greater than it should be and the interval is lengthened when the transducer-output frequency is less than what it should be. Such variable-width intervals are achieved by having a counter which counts a predetermined number of counts and then provides an output and resets itself. Any of the well-known ring-type counters can perform such a function.

It should be noted that the interval provided between output pulses of the preset counter is not the same over the complete range of pressures or other variables being measured. Since the frequency of the oscillations which are provided by the transducer decrease with increase in pressure, this interval also increases. The preset counter does provide compensation for deviations from what might be called the normal interval which is to be established at any given point for value of the variable quantity being measured.

In the description that follows, reference is made to flip-flop circuits and gate circuits. Flip-flop circuits and gates are well-known circuitry in the electronic art, suitable circuitry respectively being shown on pages 96–99 and 117–123 in the book, "Electronics" by Elmore & Sands published by the McGraw-Hill Book Company, Inc., 1949. As is well-known, the flip-flop circuit includes two tubes and has two stable conditions, one of which is with current conduction of one tube and non-conduction of the other, and the second stable condition is with the conduction-non-conduction states of the tubes reversed. The flip-flop circuit may be driven from one to the other stable condition by pulses applied to its inputs. Output may be taken from either or both of the two tubes. The gate circuits are coincidence circuits and require the presence of both inputs simultaneously to provide an output. One of the inputs is designated as the enabling or gate opening input and the other input is then the one that is permitted to be passed through the gate.

The output of the preset counter is applied to a latch gate 58. The latch gate has a second input which might be called a required enabling input. Assuming that the latch gate is open, the output of the preset counter is applied therethrough to a control flip-flop 60 to set it in one of its stable conditions. When this occurs, the output of the control flip-flop is applied to the count gate 62 to open it. At this time, the count gate 62 can apply the pulses being received from the pulse shaper 52 to a succeeding frequency counter 28. The frequency counter counts these pulses over an interval which is determined by an interval between the two succeeding output pulses from the preset counter. This may be alternatively expressed as the interval required to count to a predetermined number. Upon the succeeding output from the preset counter being received, the control flip-flop is driven to its second stable condition, whereupon it removes its enabling input from the count gate 62. At this time, the frequency counter 28 receives no further pulses from the transducer.

The output of the control flip-flop 60 in its second stable condition is applied to a latch flip-flop 64. The latch flip-flop is driven to its second stable condition, whereupon it removes the enabling output from the latch gate 58. The latch gate 58 is then closed. The output of the latch flip-flop 64 at this time is applied to a reset pulse generator 66, which in response thereto applies a reset pulse to the frequency counter 28 to establish it at its initial count condition. The reset pulse generator output is also applied to a delay multivibrator 68. The reset pulse generator may be a thryratron circuit of the type shown and described on pages 85–86 of the above-noted book, "Electronics." The delay multivibrator is also well-known circuitry and is described and shown on pages 87–92 of the above-noted book.

The delay multivibrator supplies an output pulse after a suitable delay period which is required for the frequency counter to be re-established in its initial counting condition. The delay multivibrator output is applied to the latch flip-flop 64, to reset it and thus to enable it to apply its enabling output to the latch gate 58. Upon receiving this enabling output, the latch gate is again opened and thus is in condition to apply to the control flip-flop which follows it the next output pulse from the preset counter. This then initiates a second counting interval for the output from the pressure-to-frequency transducer.

The frequency counter 28 may be any of the well-known and commercially available counters which can provide an output indicative of the number of pulses which are applied to their input. The output of the counter may be calibrated to read directly the pressure being measured by the transducer. Suitable counters are described on pages 216 et seq. of the above-noted book, "Electronics."

Time base control 30 shown in FIGURE 2 will now be recognized as the circuitry in FIGURE 3 which includes the preset counter 56, latch gate 58, control flip-flop 60, latch flip-flop 64, and delay multivibrator 68. Essentially, FIGURES 2 and 3 illustrate circuits for performing the same function, namely, varying in accordance with a derived difference frequency the counting interval of a counter which counts the oscillations derived from the manifestation of a linear variable. The use of the multiplier in FIGURE 2 is an expedient for getting the transducer output frequency close enough to the time base oscillator frequency so that the time base difference frequency is not too large. Where it is desired to operate with lower frequencies, both the multiplier 32, the oscillator 22 and the mixer and band pass filter 24 may be omitted from the circuit shown in FIGURE 2 to provide the one shown in FIGURE 3.

The count presented by the counter may be expressed mathematically as follows:

$$N = K \frac{F_p}{F_f - F_p}$$

where $N$ is the count of the counter 28, $K$ is the number which is counted by the preset counter, $F_p$ is the output frequency of the transducer, and $F_f$ is the output of the fixed-frequency oscillator. Since frequency and period are reciprocals, it follows that a nonlinearity in one can compensate for a nonlinearity in the other. The time base employed here is a function of the frequency which is being counted. Accordingly, by providing a nonlinear variation of this time base, a compensation is made for the nonlinearities in the frequencies being counted. In an embodiment of the invention which was built, where the fixed-oscillator frequency was selected as two and one-half times the frequency of the output of the transducer, a deviation from linearity was obtained on the order of one part per thousand.

Accordingly, there has been shown and described herein a novel and useful arrangement for providing a linear digital output in response to an input comprising oscillations, the frequency of which varies nonlinearly with linear variations of an associated variable. It should be understood that although the embodiment of the invention is described in connection with a transducer for measuring pressure, this is by way of illustration and is not to be construed as a limitation herein.

I claim:

In a system having a condition responsive transducer of the type having a nonlinear frequency output which varies in accordance with variations in the input to said transducer, the nonlinearity being of such nature that the output transducer frequency is greater than that of a linear output, and a frequency counter to determine the number of oscillations afforded by the output of said transducer during a given period of time for indication of the prevailing value of said condition, means for insuring linearity between the number of oscillations counted by said counter and the value of said condition throughout a range of variations of said condition comprising, means including a source of substantially constant frequency signal in circuit with both said transducer and said counter for varying said given period of time said counter is operable in accordance with the difference between the variable output of said transducer and the frequency signal from said source whereby the number of oscillations counted by said counter is caused to vary substanitally linearly with variations in the value of said given condition throughout said range of variations thereof.

References Cited in the file of this patent

UNITED STATES PATENTS

| | | |
|---|---|---|
| 2,414,479 | Miller | Jan. 21, 1947 |
| 2,447,817 | Rieber | Aug. 24, 1948 |
| 2,590,641 | Musk | Mar. 25, 1952 |
| 2,593,339 | Ostermann et al. | Apr. 15, 1952 |
| 2,604,787 | Coyne et al. | July 29, 1952 |
| 2,613,071 | Hansel | Oct. 7, 1952 |
| 2,675,510 | Belcher | Apr. 13, 1954 |
| 2,680,779 | Anderson | June 8, 1954 |
| 2,780,101 | Kinkel | Feb. 5, 1957 |
| 2,880,612 | Coyne | Apr. 7, 1959 |

OTHER REFERENCES

"Frequency Meter Uses Digital Counters" article in Electronics, June 1954, pages 189–191.